United States Patent
Warren et al.

(10) Patent No.: US 9,961,125 B2
(45) Date of Patent: May 1, 2018

(54) MESSAGING API OVER HTTP PROTOCOL TO ESTABLISH CONTEXT FOR DATA EXCHANGE

(71) Applicant: Microsoft Corporation, Redmond, WA (US)

(72) Inventors: Joseph Warren, Renton, WA (US); Darrell Brunsch, Redmond, WA (US); Christopher Knestrick, Bellevue, WA (US); Darren Gonzales, Kirkland, WA (US); Robert Novitskey, Redmond, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 146 days.

(21) Appl. No.: 13/956,014

(22) Filed: Jul. 31, 2013

(65) Prior Publication Data
US 2015/0039676 A1    Feb. 5, 2015

(51) Int. Cl.
H04L 29/08    (2006.01)

(52) U.S. Cl.
CPC ............ *H04L 67/02* (2013.01); *H04L 67/146* (2013.01)

(58) Field of Classification Search
CPC ......... H04L 67/02; H04L 45/16; H04L 69/08; H04L 67/2823; G06F 9/543; G06F 17/30569; G06F 17/30893
See application file for complete search history.

(56) References Cited

U.S. PATENT DOCUMENTS

| 4,929,939 A | 5/1990 | Varma et al. |
| 5,892,915 A | 4/1999 | Duso |
| 5,974,503 A | 10/1999 | Venkatesh |

(Continued)

FOREIGN PATENT DOCUMENTS

| CN | 103152781 A | 6/2013 |
| EP | 1519292 A1 | 3/2005 |

(Continued)

OTHER PUBLICATIONS

"Zarafa", Retrieved at <<http://doc.zarafa.com/7.1/Administrator_Manual/en-US/html/_protocols_and_connections.html>> Sep. 20, 2012, pp. 1.

(Continued)

*Primary Examiner* — Kim T Nguyen

(57) ABSTRACT

Technologies are provided for a protocol for retrieving data from a remote server at a local client and establishing a context for the client at the server. A client may execute an application enabling users to receive data such as emails stored at the server. The client may employ a messaging-over hypertext transfer protocol (HTTP) to request the data from the server. An HTTP POST request may incorporate specialized headers with instructions for data retrieval, and may enable the client to establish a context with the server to identify the client for subsequent data requests. After receipt of the POST request, the server may send a receipt response and chunked intermediary responses while the request is being processed. The server may also send a cookie to the client representing the context of the client, and the client may return the cookies with subsequent data requests to the server.

20 Claims, 6 Drawing Sheets

(56) References Cited

U.S. PATENT DOCUMENTS

| | | | |
|---|---|---|---|
| 5,978,566 | A | 11/1999 | Plank et al. |
| 6,931,447 | B1* | 8/2005 | Hemstreet ............... H04L 67/02 709/227 |
| 7,447,745 | B2 | 11/2008 | Lehavi |
| 7,539,722 | B2 | 5/2009 | Mohamed et al. |
| 7,577,153 | B2 | 8/2009 | Kono |
| 7,600,048 | B2 | 10/2009 | Guest |
| 7,617,525 | B1 | 11/2009 | Moeck et al. |
| 8,166,406 | B1 | 4/2012 | Goldfeder |
| 8,204,998 | B1 | 6/2012 | Upadhyay |
| 8,228,832 | B2 | 7/2012 | Black et al. |
| 8,396,756 | B1 | 3/2013 | Stevens |
| 8,402,149 | B2 | 3/2013 | Motoyama et al. |
| 8,407,298 | B2 | 3/2013 | Kamat et al. |
| 9,014,001 | B2* | 4/2015 | Hong ............... H04L 67/327 370/236 |
| 9,280,868 | B2 | 3/2016 | Froy |
| 9,295,908 | B2 | 3/2016 | Froy |
| 2003/0046586 | A1 | 3/2003 | Bheemarasetti et al. |
| 2003/0061275 | A1 | 3/2003 | Brown et al. |
| 2003/0140180 | A1 | 7/2003 | Brown |
| 2003/0233459 | A1 | 12/2003 | Miller |
| 2004/0168052 | A1 | 8/2004 | Clisham |
| 2004/0249915 | A1 | 12/2004 | Russell |
| 2004/0268118 | A1 | 12/2004 | Bazan Bejarano |
| 2005/0050159 | A1 | 3/2005 | Suraski |
| 2005/0143166 | A1 | 6/2005 | Walker |
| 2005/0144479 | A1 | 6/2005 | Son |
| 2005/0182847 | A1 | 8/2005 | Pirzada et al. |
| 2005/0193097 | A1* | 9/2005 | Guthrie ............... H04L 67/40 709/219 |
| 2006/0095573 | A1 | 5/2006 | Carle et al. |
| 2006/0227805 | A1 | 10/2006 | Hedin et al. |
| 2006/0259612 | A1 | 11/2006 | De Oliveira et al. |
| 2006/0271697 | A1 | 11/2006 | Kruse et al. |
| 2006/0277596 | A1* | 12/2006 | Calvert ............... H04L 67/02 726/3 |
| 2007/0106670 | A1 | 5/2007 | Yoakum |
| 2007/0169171 | A1* | 7/2007 | Kumar ............... H04L 63/08 726/2 |
| 2007/0282919 | A1 | 12/2007 | Linkert |
| 2008/0137548 | A1 | 6/2008 | Hassan et al. |
| 2008/0140780 | A1 | 6/2008 | Hopkins et al. |
| 2008/0222263 | A1 | 9/2008 | Wu et al. |
| 2008/0228880 | A1 | 9/2008 | Naresh et al. |
| 2008/0250109 | A1 | 10/2008 | Jakobson |
| 2008/0317233 | A1 | 12/2008 | Rey et al. |
| 2009/0063665 | A1 | 3/2009 | Bagepalli et al. |
| 2009/0077176 | A1 | 3/2009 | Shae |
| 2009/0081950 | A1* | 3/2009 | Matsubara ............... H04H 60/80 455/3.06 |
| 2009/0193443 | A1 | 7/2009 | Lakshmanan et al. |
| 2009/0204666 | A1* | 8/2009 | Sana et al. ............... 709/203 |
| 2010/0024015 | A1 | 1/2010 | Hardt |
| 2010/0064047 | A1 | 3/2010 | Sullivan |
| 2010/0107205 | A1 | 4/2010 | Foti |
| 2010/0228845 | A1 | 9/2010 | Choi |
| 2010/0313078 | A1 | 12/2010 | Burckart |
| 2010/0325419 | A1 | 12/2010 | Kanekar |
| 2011/0106874 | A1 | 5/2011 | Walsh et al. |
| 2011/0119323 | A1 | 5/2011 | Tani |
| 2011/0179104 | A1 | 7/2011 | Hakoda |
| 2011/0214115 | A1 | 9/2011 | Kuusilinna |
| 2011/0320820 | A1* | 12/2011 | Wray ............... 713/176 |
| 2011/0321118 | A1 | 12/2011 | Boldyrev |
| 2012/0185599 | A1 | 7/2012 | Chien |
| 2012/0191651 | A1 | 7/2012 | Irizarry |
| 2013/0007156 | A1 | 1/2013 | Roy et al. |
| 2013/0007518 | A1 | 1/2013 | George et al. |
| 2013/0111572 | A1 | 5/2013 | Gaddam |
| 2013/0198819 | A1 | 8/2013 | Gordon et al. |
| 2013/0279395 | A1 | 10/2013 | Aramoto |
| 2013/0332618 | A1 | 12/2013 | Kasivajjula et al. |
| 2014/0156788 | A1 | 6/2014 | Lewis |
| 2014/0173036 | A1 | 6/2014 | Das |
| 2014/0193047 | A1 | 7/2014 | Grosz et al. |
| 2014/0201376 | A1 | 7/2014 | Godin |
| 2015/0039675 | A1* | 2/2015 | Warren et al. ............... 709/203 |
| 2015/0088978 | A1 | 3/2015 | Motukuru |
| 2015/0142981 | A1 | 5/2015 | Gonzales et al. |
| 2015/0142982 | A1 | 5/2015 | Gonzales et al. |
| 2015/0189230 | A1 | 7/2015 | Shapiro |
| 2016/0285770 | A1 | 9/2016 | Yang |

FOREIGN PATENT DOCUMENTS

| | | |
|---|---|---|
| EP | 1617592 A1 | 1/2006 |
| EP | 2339798 A1 | 6/2011 |
| WO | WO 98/02824 A1 | 1/1998 |
| WO | WO 2007040581 A3 | 5/2009 |

OTHER PUBLICATIONS

"Configuring Outlook RPC over HTTP", Retrieved at <<http://exclusivelyexchange.com/outlook-rpc-over-http-client/>> Nov. 4, 2011, pp. 5.

"Deploying the BIG-IP System v10 with Microsoft Exchange Server 2010", Retrieved at <<http://www.f5.com/pdf/deployment-guides/f5-exchange-2010-dg.pdf>> Feb. 15, 2010, pp. 83.

"MAPI and RPC over HTTP", Retrieved at <<http://technet.microsoft.com/en-us/library/aa996632(v=exchg.65).aspx>> May 23, 2005, pp. 4.

"Zimbra Collaboration Server", Retrieved at <<http://www.zimbra.com/products/zimbra-open-source.html>> Jul. 12, 2012, pp. 5.

Derbyshire, Lee, "Connecting POP and IMAP Clients to MS Exchange Server", Retrieved at <<http://www.msexchange.org/articles-tutorials/exchange-server-5-5/Connecting_POP_And_IMAP_Clients_To_MS_Exchange_Server.html>> Jul. 7, 2002, pp. 3.

"Makani MAPI Protocol Optimization", Retrieved at <<http://www.makaninetworks.com/register/docs/makani-mapi.pdf>>, Jan. 13, 2012, 4 pgs.

"MAPI and RPC over HTTP", Retrieved at <<http://technet.microsoft.com/en-us/library/aa996632(v=exchg.65).aspx>>, Feb. 14, 2011, 3 pgs.

"Troubleshooting Long Running MAPI connections to Exchange Server 2010 through Network Load Balancers", Retrieved at <<http://support.microsoft.com/kb/2535656>>, Mar. 19, 2012, 4 pgs.

Kale, et al., "Securing Remote Procedure Calls over HTTPS", Retrieved at <<http://arxiv.org/ftp/arxiv/papers/0909/0909.3530.pdf>>, In arXiv Preprint, arXiv:0909.3530, Sep. 18, 2009, 5 pgs.

PCT International Search Report and Written Opinion in International Application PCT/US2014/048756, dated Nov. 17, 2014, 12 pgs.

PCT International Search Report and Written Opinion in International Application PCT/US2014/048757, dated Nov. 14, 2014, 10 pgs.

Fielding, et al.,"Hypertext Transfer Protocol—HTTP/1.1", Published on: Jun. 1999, Available at: http://tools.ietf.org/html/rfc2616#section-10.1.2, 352 pgs.

Kassinen et al., "Using Unstructured Service Supplementary Data Signaling for Mobile peer-to-peer Invocations", In Proceedings of the 12th International Symposium on Wireless Personal Multimedia Communications, Published on: Sep. 7, 2009, 5 pages.

Shih et al., "Wake on Wireless: An Event Driven Energy Saving Strategy for Battery Operated Devices", In Proceedings of the Eighth Annual International Conference on Mobile Computing and Networking, Published on: Sep. 23, 2002, 12 pages.

U.S. Appl. No. 14/089,583 entitled "Switching of Connection Protocol", filed Nov. 25, 2013 by Gonzales et al., 40 pgs.

U.S. Appl. No. 14/089,604 entitled "Preservation of Connection Session", filed Nov. 25, 2013 by Gonzales et al., 44 pgs.

U.S. Appl. No. 13/955,863, Novitskey, et al., "Messaging Over Http Protocol for Data Exchange", filed Jul. 31, 2013, 25 pgs.

(56) References Cited

OTHER PUBLICATIONS

World's First Automatic Protocol Selection Technology for Any Environment, Published on: Mar. 7, 2013, Available at: http://phys.org/news/2013-03-world-automatic-protocol-technology-environment.html, 15 pgs.
PCT International Search Report and Written Opinion in International Application PCT/US2014/065112, dated Feb. 5, 2015, 10 pgs.
PCT International Search Report and Written Opinion in International Application PCT/US2014/065111, dated Apr. 15, 2015, 10 pgs.
"Second Written Opinion Received for PCT Patent Application No. PCT/US2014/048756", dated Jun. 15, 2015, 7 Pages.
PCT Second Written Opinion Received for Patent Application No. PCT/US2014/048757, dated Jun. 15, 2015, 7 Pages.
U.S. Appl. No. 13/955,863, Office Action dated Jul. 31, 2015, 12 pgs.
U.S. Appl. No. 14/089,604, Office Action dated Jan. 4, 2016, 15 pgs.
U.S. Appl. No. 13/955,863, Office Action dated Jan. 14, 2016, 11 pgs.
U.S. Appl. No. 14/089,583, Amendment and Response filed Feb. 16, 2016, 17 pgs.
U.S. Appl. No. 13/955,863, Amendment and response filed Mar. 31, 2016, 10 pgs.
U.S. Appl. No. 13/955,863, Amendment and response filed Aug. 5, 2016, 10 pgs.
U.S. Appl. No. 13/955,863, Office Action dated May 13, 2016, 10 pages.
U.S. Appl. No. 13/955,863, Office Action dated Oct. 12, 2016, 10 pages.
U.S. Appl. No. 14/089,583, Amendment and Response filed Aug. 3, 2016, 12 pgs.
U.S. Appl. No. 14/089,583, Office Action dated May 6, 2016, 30 pages.
U.S. Appl. No. 14/089,604, Amendment and Response filed Mar. 31, 2016, 12 pages.
U.S. Appl. No. 14/089,604, Amendment and Response filed Sep. 28, 2016, 9 pages.
U.S. Appl. No. 14/089,604, Office Action dated Oct. 20, 2016, 21 pages.
U.S. Appl. No. 14/089,604, Office Action dated Jun. 30, 2016, 16 pgs.
U.S. Appl. No. 13/955,863, Amendment and Response filed Nov. 2, 2015, 13 pgs.
U.S. Appl. No. 14/089,583, Office Action dated Nov. 16, 2015, 28 pgs.
PCT 2nd Written Opinion in International Application PCT/US2014/065111, dated Sep. 23, 2015, 5 pgs.
U.S. Appl. No. 14/089,583, Office Action dated Feb. 2, 2017, 29 pgs.
U.S. Appl. No. 14/089,583, Office Action dated Aug. 11, 2017, 33 pages.
U.S. Appl. No. 14/089,583, Amendment and Response filed Oct. 11, 2017, 12 pages.
U.S. Appl. No. 14/089,583, Advisory Action dated Oct. 27, 2017, 3 pages.
U.S. Appl. No. 14/089,583, Office Action dated Jan. 8, 2018, 33 pages.

\* cited by examiner

MESSAGING API OVER HTTP PROTOCOL TO ESTABLISH CONTEXT FOR DATA EXCHANGE

BACKGROUND

In a communications environment, a client/server relationship is often used to interconnect services that may be distributed across different remote locations. Often times a user may execute an application locally on the user's client device, and the application may retrieve data associated with the application from a remote server connected with the client device over a network. In an example scenario, after a connection is established between the client device and the server, the application may forward a request to the server, and the server may in turn send a request to a database to retrieve requested data and information. The server may return the retrieved data to the client device which may display the information to the user and enable the user to interact with the data.

A remote procedure call (RPC) protocol may sometimes be used to forward a request from a local client to a remote server to retrieve requested data. The RPC protocol, however, may involve some complex coding, and may require specialized configurations on the server side for enabling a successful RPC protocol for data retrieval. Additionally, some servers may become overloaded when a large quantity of users employ the RPC for accessing data, due to multiple redundancy of the RPC protocol. When servers become overloaded, users can lose established connections and may be unable to reconnect, which may reduce an overall quality of experience for user, and may prevent the user from accessing data through the client application. Furthermore, when a user is able to reconnect, the user may have to re-authenticate themselves with the server, because a context between the server and the client may only be active as long as a specific connection is alive. If the connection is lost due to a dropped connection, going out of range, switching to a new connection, or going into hibernation, for example, the user may have to re-establish a context with the server each time the client reconnects.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to a protocol for retrieving data from a remote server at a local client and establishing a context for the client at the server. A client, such as a productivity or communications application, may enable users to receive data such as emails stored at the remote server on a user's local device. The client may incorporate specialized headers with established hypertext transfer protocol (HTTP) language such as an HTTP POST request in order to retrieve data. The headers may include instructions for data retrieval, and may also enable the client to establish a context with the server to identify the client for subsequent data requests. After receipt of the POST or similar request, the server may send a receipt response and chunked intermediary responses while the request is being processed. Additionally, after receipt of the POST or similar request, the server may generate a cookie representing a context of the client. The server may provide the cookie to the client in the intermediary responses and the client may save the cookie for future data requests. The client may return the cookies with subsequent data requests to the server for validation of the context and that the client is the same authenticated client.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

Figure 1:
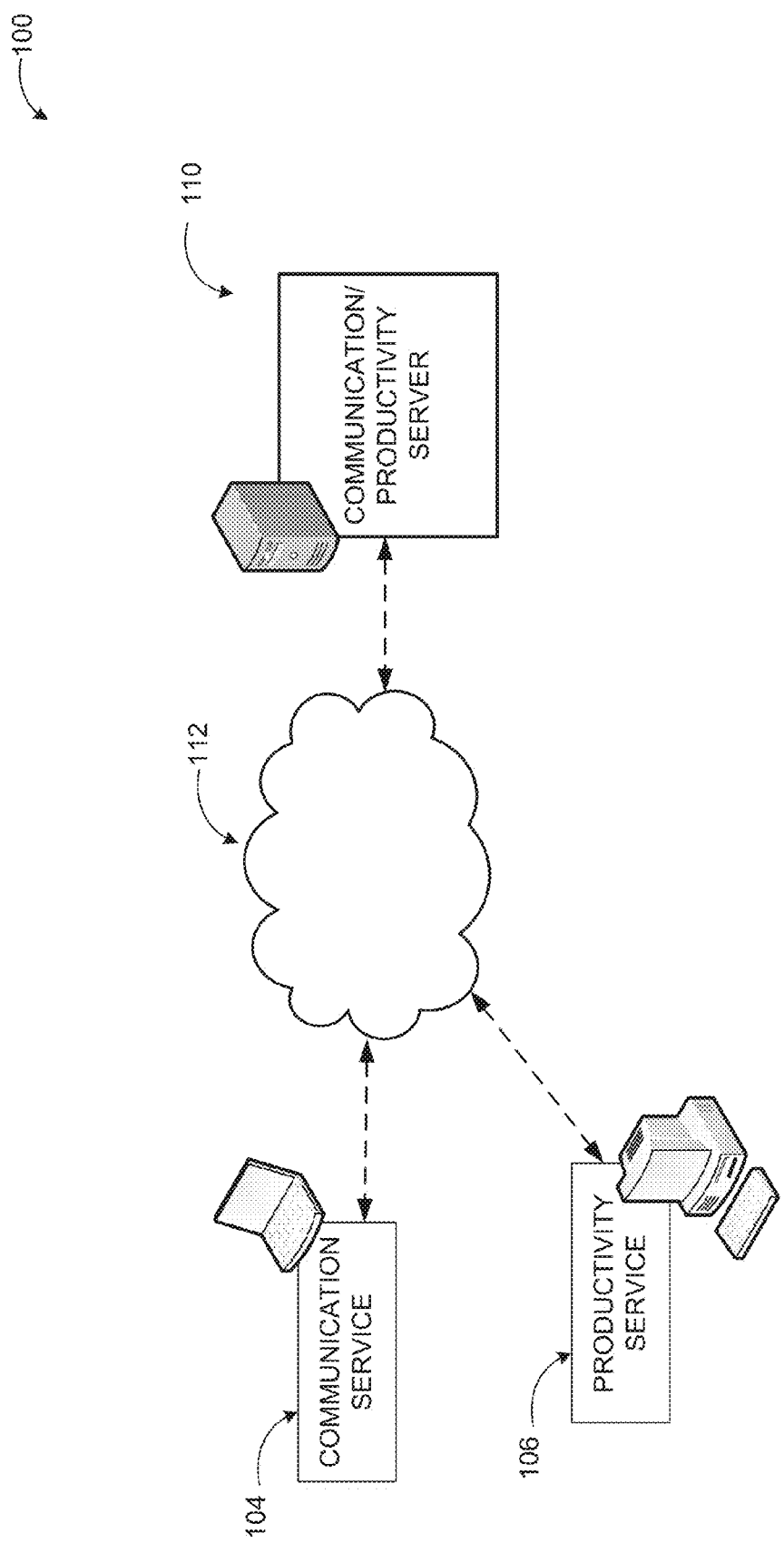
FIG. 1 illustrates an example environment where a client may access productivity and communication services over a network.

As briefly described above, a system is described for providing a protocol for retrieving data from a remote server at a local client and establishing a context for the client at the server. A client may employ established hypertext transfer protocol (HTTP) language such as an HTTP POST request to retrieve data at the client form the server. The HTTP POST request may include headers with instructions for data retrieval, and may enable the client to establish a context with the server to identify the client for subsequent data requests. Upon receiving a data request, the server may generate a cookie representing a context of the client. The server may provide the cookie to the client with chunked intermediary responses, and the client may return the cookies with subsequent data requests to the server.

In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While the embodiments will be described in the general context of program modules that execute in conjunction with an application program that runs on an operating system on a computing device, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium can for example be implemented via one or more of a volatile computer memory, a non-volatile memory, a hard drive, a flash drive, a floppy disk, or compact servers, an application executed on a single computing device, and comparable systems.

Throughout this specification, the term "platform" may be a combination of software and hardware components for providing a messaging-over-HTTP protocol to establish a context between a client and a server and to exchange data over a network. Examples of platforms include, but are not limited to, a hosted service executed over a plurality of servers, an application executed on a single computing device, and comparable systems. The term "server" generally refers to a computing device executing one or more software programs typically in a networked environment. However, a server may also be implemented as a virtual server (software programs) executed on one or more computing devices viewed as a server on the network. More detail on these technologies and example operations is provided below.

FIG. 1 illustrates an example environment where a client may access productivity and communication services over a network, according to some embodiments herein. The computing devices and computing environments shown in diagram 100 are for illustration purposes. Embodiments may be implemented in various local, networked, and similar computing environments employing a variety of computing devices and systems.

As illustrated in diagram 100, a user may employ a variety of different client devices to execute applications for exchanging and interacting with data. Example applications executed at a user's client device for interacting with data may be a productivity service 106 and a communication service 104.

An example productivity service 106 may be configured to provide access to various services built around a productivity platform. Some productivity services may include an email application, a social networking application, a collaboration application, an enterprise management application, a messaging application, a word processing application, a spreadsheet application, a database application and a presentation application. The productivity service 106 may provide access to data associated with the various productivity applications by retrieving the data from a remote server 110. The remote server 110 may be accessed over a network 112, which may be a wired or wireless network, or a cloud network, and the retrieved data may be loaded at a user's local client device executing the productivity service 106.

Similarly, an example communication service 104 may be a service configured to provide email, contacts management, and calendar services. The communication service 104 may also provide real-time communications platforms, such as instant messaging, audio/visual conferencing, and presence detection. For example, a user may receive, view and reply to emails at the communication service 104 executed on the user's client device. Some example client devices for viewing emails and accessing other communications data may include as a desktop computing device, a personal computer, a tablet, a smartphone, a whiteboard and other similar client devices. The communication service and the productivity service may also work in conjunction to retrieve and exchange email and other data.

The services provided by the communication service 104 and the productivity service 106 may be hosted at an external server associated with the communication service 104 and the productivity service 106, and a user may access the provided services locally at a user's client device over the network 112. Additionally, data may be exchanged between the local client device and the server over the network 112, such that the local client device may need to have an active connection with the server 110 over the network in order to access and interact with data provided by the communication service 104 and the productivity service 106.

The local client, such as the communication service 104 or the productivity service 106 may issue a number of requests to the server 110 to retrieve data. Each time the local client requests data from the server 110, the client may have to authenticate itself with the server. Additionally, if the connection between the client and the server 110 is dropped or changed during the data request and exchange, the client may have to re-authenticate itself with the server to re-establish the connection for data exchange. In a system according to embodiments, a context may be established between the client and the server 110 during an initial data request, and the context may be used as a basis of authentication for subsequent data retrieval requests.

The term "context" is used herein to represent a collection of state on the server that is held between unique client requests and is referenced using a cookie returned when the "context" was created and on each subsequent response. The collection of state information may be uniquely specific to server implementation and not specifically identified or defined within the protocol itself as it is never transmitted across the wire. The collection of state may also be not tied to any physical or logical connection from the client to the server. A client may be free to issue subsequent requests to the server identifying the "context" via a cookie on any newly established connections independent of the connection in which the "context" was initially created.

Figure 2:
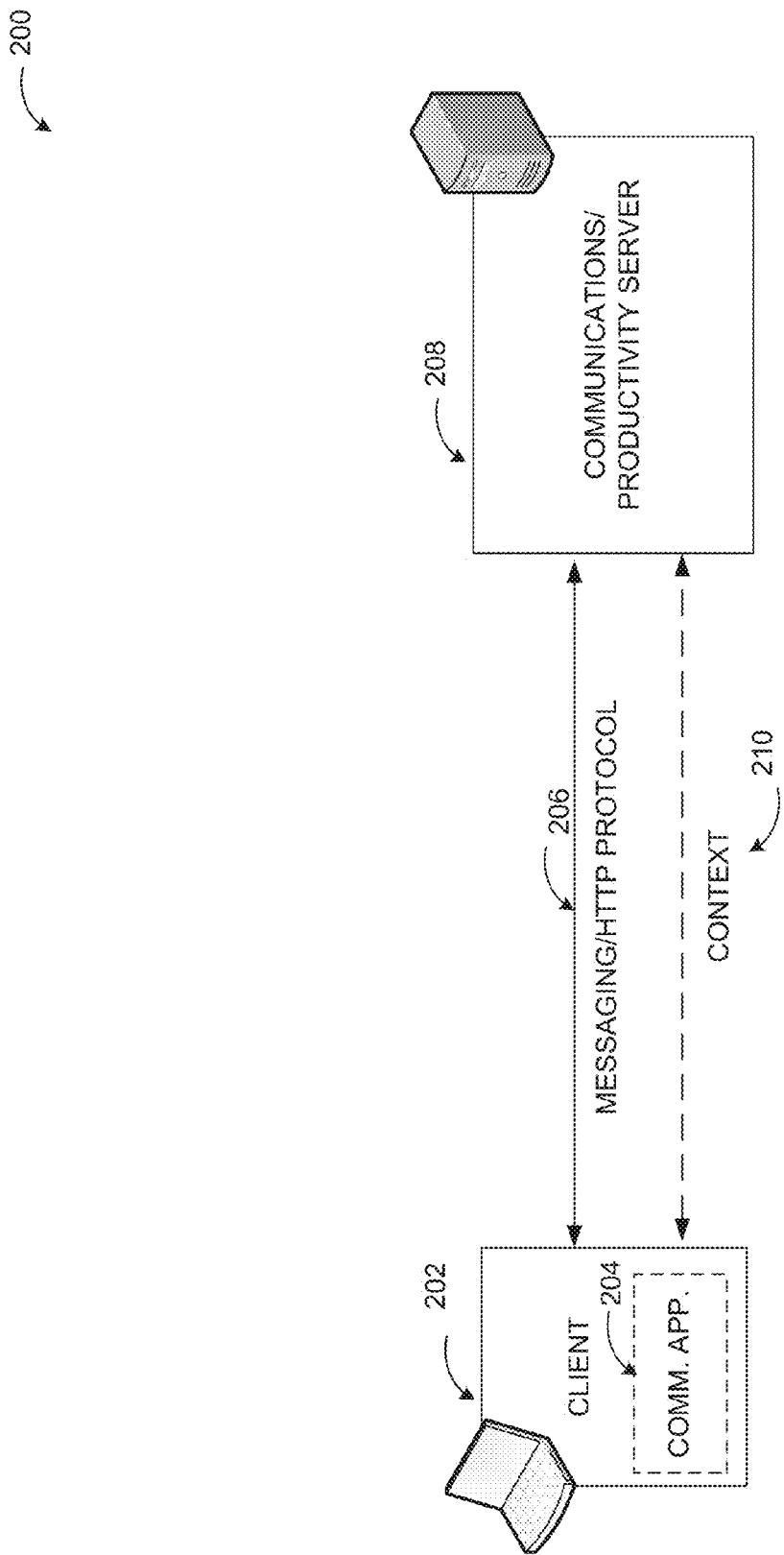
FIG. 2 illustrates an example data exchange between a client and a server employing messaging-over-HTTP protocol.

FIG. 2 illustrates an example data exchange between a client and a server employing messaging-over-HTTP protocol, according to some embodiments herein.

As illustrated in diagram 200, a client 202 may execute a productivity application or a communication application 204, such as an email, contacts and calendar management application, on a local device. The client 202 may communicate with a server 208 over a network to retrieve data associated with the communication application 204 such as email data.

In a system according to embodiments, a connection may be established between the client 202 and the server 208 in order to enable data to be exchanged with the communication application 204. The client 202 may initiate a connection with the server 208, and may request data from the server 208. The server 208 may accept the request, process the request, and return the requested information to the client 202. During the initial request, a context 210 may be established between the client 202 and the server 208 to authenticate the client 202 for subsequent data retrieval requests.

In an example embodiment, HTTP may be employed for to facilitate communication, authentication, and exchange of data between the client and the server 208. Established HTTP language may define methods, or verbs, which may indicate the desired action to be performed by the server to retrieve requested information. For example, a verb may include a GET verb which may be a request to retrieve data. Another example verb employed in HTTP may be a POST verb which may be an action to request that the server accept data enclosed in the HTTP request as a new data to be added to data at the server.

In an example embodiment, the client 202 may incorporate a messaging protocol over established HTTP requests in order to facilitate retrieving data associated with the communication application executed at the client from the server 208. The messaging-over-HTTP protocol 206 may enable the client 202 to send a request to the server 208 over an HTTP connection and to receive a server response over the same HTTP connection. The messaging-over-HTTP protocol 206 may also enable the client 202 to establish a context with the server 208 over the HTTP connection for authenticating the client during future requests. Furthermore, the client 202 may open additional HTTP connections with the server 208 to send concurrent independent requests to the server 208.

In an example embodiment, the client 202 request may incorporate data request language with traditional HTTP POST request language to generate the messaging-over-HTTP protocol. The messaging-over-HTTP protocol may include a specialized header structure for instructing the server with what data to retrieve and how to respond to the client. The specialized header structure may include a request type header, a request identification header, a mailbox identification header and a content-type header. A request type header may be an X-RequestType header which may be employed to tell the server 208 what operation the client 202 is attempting to perform. For example, a connect request may be a request to access and retrieve data from a mailbox associated with an email account. A bind request may be a request to access and retrieve data from an address book associated with a contacts management application.

Additionally, the request identification header may be an X-RequestID header which may identify the client 202 to the server 208. The server 208 may not accept un-identified or anonymous requests. Additionally, the mailbox identification header may be a MailboxID parameter that uniquely identifies an email account or mailbox associated with the client from which the server 208 is requested to retrieve email data. Further the POST request may include a content type header, which may be a Content-Type header set to "application/mapi-http." The headers discussed herein are examples for illustration purposes and are not intended to be limitations on embodiments.

An example messaging-over-HTTP protocol request may be as follows:

```
POST /<endpoint>/?MailboxId=<GUID>@contoso.com HTTP/1.1
Host: mail.contoso.com
Content-Length: <length>
Content-Type: application/mapi-http
X-RequestType: EcDoConnectEx
X-RequestId: <GUID>:<ID>
<RAW BINARY REQUEST BODY>
```

An example messaging-over-HTTP protocol request employing a bind request may be as follows

```
POST /<endpoint>/?MailboxId=<GUID>@contoso.com HTTP/1.1
Host: mail.contoso.com
Content-Length: <length>
Content-Type: application/mapi-http
X-RequestType: Bind
X-RequestId: <GUID>:<ID>
<RAW BINARY REQUEST BODY>
```

An example messaging-over-HTTP protocol request employing a connect request may be as follows:

```
POST /<endpoint>/?MailboxId=<GUID>@contoso.com HTTP/1.1
Host: mail.contoso.com
Content-Length: <length>
Content-Type: application/mapi-http
X-RequestType: Connect
X-RequestId: <GUID>:<ID>
<RAW BINARY REQUEST BODY>
```

Figure 3:
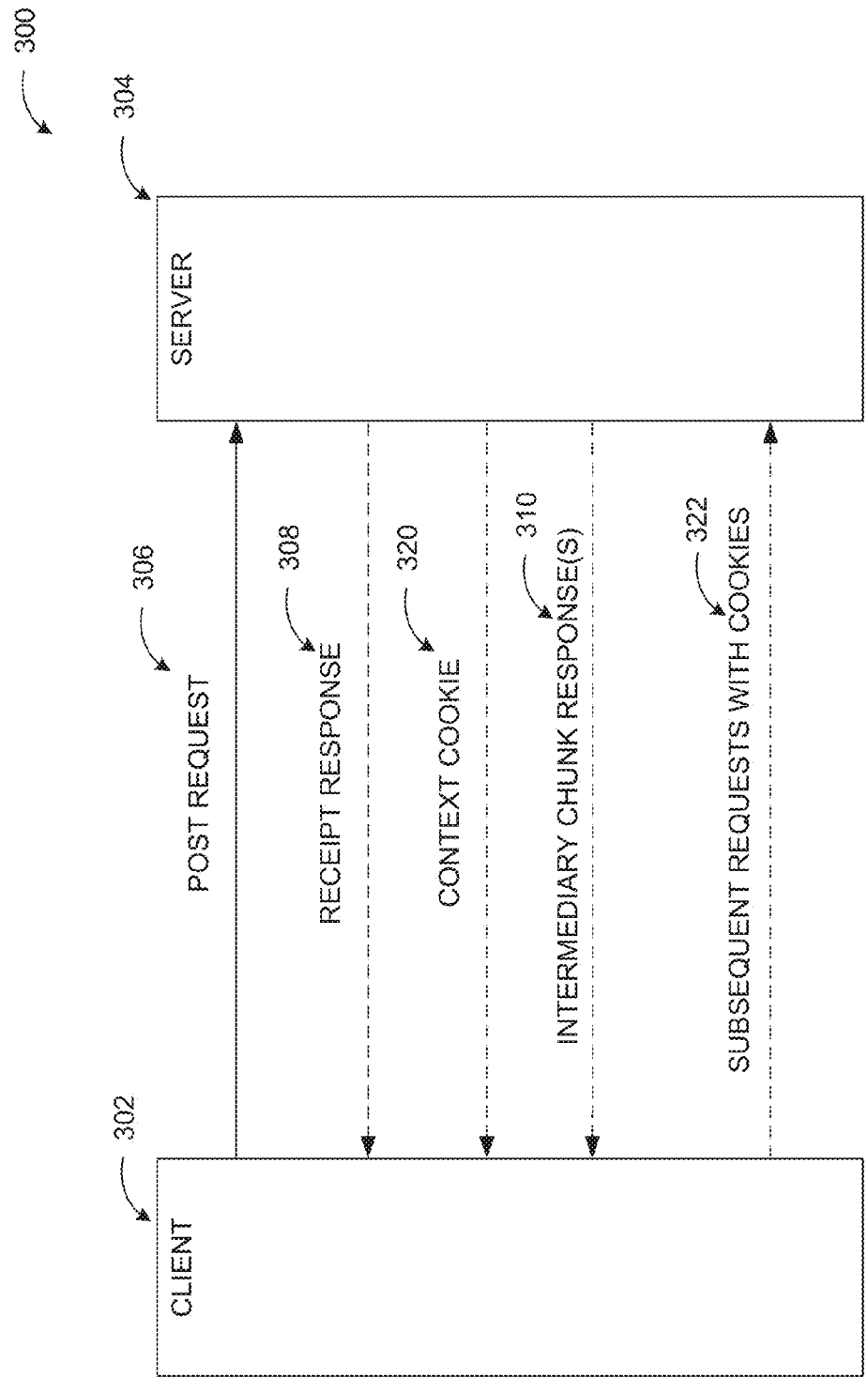
FIG. 3 illustrates example data requests and responses exchanged between a client and a server to establish a context employing messaging-over-HTTP protocol.

FIG. 3 illustrates example data requests and responses exchanged between a client and a server to establish a context employing messaging-over-HTTP protocol, according to some example embodiments.

As previously described in conjunction with FIG. 2, a client 302 may utilize a standardized HTTP POST request in order to request data from a server 304 associated with an application executed at the client 302. The specialized data request language may be incorporated with the HTTP POST request language to produce a messaging-over-HTTP protocol configured to instruct the server 304 what data to retrieve, where to retrieve it from, and how to respond to the client 302. The messaging-over-HTTP protocol may also be configured to establish a context between the client 302 and the server 304 to authenticate the client 302 to the server for future data requests.

As illustrated in diagram 300, after the server receives an initial POST request 306, a series of responses may be returned to the client from the server. The initial POST request 306 may include instructions for the server 304 to respond to the initial POST request 306 with a receipt response 308 while the POST request 306 is being queued and processed by the server 304. The receipt response 308 may provide the client 302 with an acknowledgement that the server 304 has received the request in order to prevent the client 302 from being unaware of a dropped connection or unavailability of the server 304 to process a request. If the client 302 does not receive the receipt response 308 within a reasonable period of time, then the client 302 may abandon and/or retry the POST request 306.

In an example embodiment, the server 304 may also return intermediary chunk responses 310 while the server 304 processes the POST request 306. A chunked response 310 from the server may include a Transfer-Encoding header with "chunked" as the transfer encoding. The chunked transfer encoding value may enable the server 304 to return intermediary responses and data to the client 302 while the POST request 306 is being processed by the server. The intermediary chunk responses 310 may provide a status of the request to the client 302 to indicate that the connection between the client 302 and server 304 has not been disconnected, and the server 304 is currently processing the POST request 306. If the client 302 does not receive an expected intermediary response within a reasonable period of time, then the client 302 may abandon and/or retry the POST request 306. An expected period of time for delivering intermediary responses may be defined by the client or the server, and may also be a configurable setting. The intermediary chunk responses 310 may also serve to keep the underlying HTTP connection active while the server 304 processes the POST request 306.

In a system according to embodiments, the server 304 may also generate a cookie 320 to identify the client 302 and to establish a context of the client 302 with the server 304. The server 304 may return the cookie 320 to the client 302 with the receipt response and with intermediary chunk responses in order to establish the context between the client 302 and the server 304. The server 304 may define the cookie name and value according to server policies.

An example response from the server 304 to the client 302 including the generated cookie may be as follows:

```
HTTP/1.1 200 OK
Host: mail.contoso.com
Transfer-Encoding: chunked
Content-Length: <length>
Content-Type: application/mapi-http
Set-Cookie: MapiContext=<opaque string>
Set-Cookie: MapiSequence=<opaque string>
X-RequestType: EcDoConnectEx (Bind or Connect)
X-ResponseCode: <value>
<RAW BINARY RESPONSE BODY>
```

Upon receiving the cookie 320, the client 302 may store the cookie 320 for future interactions with the server 304. When the client sends subsequent data requests to the server 304 employing the messaging-over-HTTP protocol, the client 302 may include the cookie 320 in the subsequent request 322.

An example subsequent messaging-over-HTTP protocol data request including the received cookie may be as follows:

```
POST /<endpoint>/?MailboxId=<GUID>@contoso.com HTTP/1.1
Host: mail.contoso.com
Content-Length: <length>
Content-Type: application/mapi-http
Cookie: MapiContext=<opaque string>
Cookie: MapiSequence=<opaque string>
X-RequestType: EcDoConnectEx
X-ClientInfo: <opaque string>
X-RequestId: <GUID>:<ID>
<RAW BINARY REQUEST BODY>
```

In an example embodiment, since the client 302 stores the cookie 320 and returns the cookie 320 during subsequent requests, the client 302 may not have to re-authenticate itself with the server 304 during each subsequent data request. The client 302 may provide the cookie 320 to the server 304, and the server may automatically validate that the context represented by the cookie is from the same authenticated client. The server 304 may return the requested data to the authenticated client 302 in a final response.

In a system according to embodiments, the cookie may enable the context between the client and the server to be preserved in the event of a lost connection. For example, an HTTP connection may be lost when the client goes out of range, disconnects, changes connections, or goes into a hibernation mode. The client may still maintain the cookie 320 during the disconnection, and upon reconnection, the client 302 may provide the cookie 320 to the server 304 when the client 302 initiates a data request. The server 304 may be configured to store the context associated with the cookie 320 for a period of time, such that the client 302 may have some time to re-establish the connection with the server 304 before the context expires. After the defined period of time, the context may expire, and the client 302 may have to authenticate itself at the server 304 during a data request. A new cookie may be generated by the server and exchanged with the client to establish a new context.

In an example embodiment, the period of time for preserving the context may be predefined, and may also be configurable based on a network type, a client type, client devices associated with user, security parameters, and other similar parameters. The period of time for preserving the context may also be dynamic based on available resources at the server. For example, if only one client is interacting with the server 304, the server may preserve the context for a longer period of time because the client is not consuming a lot of server resources. If there are multiple users or clients interacting with the server 304, the server 304 may limit the number of preserved contexts and the time for preserving the contexts to preserver server resources. The server 304 may also communicate with the client 302 to tell the client 302 when the context will be expired. The client 302 may be able to refresh the established context to prolong a period of time of preservation for the context by communicating with server. For example, each time the client 302 actively communicates with the server 304, the server 304 may refresh the expiration time of the context. After a context is expired, the context may be permanently discarded at the server 304.

The example systems in FIG. 1 through 3 have been described with specific configurations, applications, and interactions. Embodiments are not limited to systems according to these examples. A system for providing a messaging-over-HTTP protocol to establish a context between a client and a server and to exchange data over a network may be implemented in configurations employing fewer or additional components and performing other tasks. Furthermore, specific protocols and/or interfaces may be implemented in a similar manner using the principles described herein.

Figure 4:
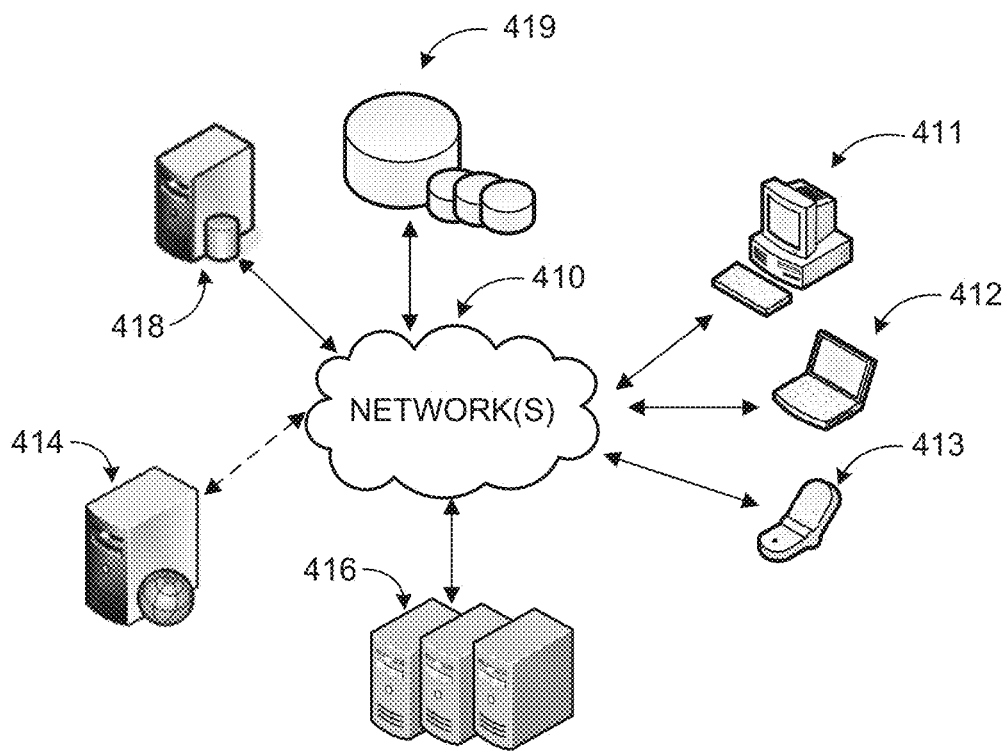
FIG. 4 is a networked environment, where a system according to embodiments may be implemented.

FIG. 4 is an example networked environment, where embodiments may be implemented. A system for providing a messaging-over-HTTP protocol to establish a context between a client and a server and to exchange data over a network may be implemented via software executed over one or more servers 414 such as a hosted service. The platform may communicate with client applications on individual computing devices such as a smart phone 413, a laptop computer 412, or desktop computer 411 ('client devices') through network(s) 410.

Client applications executed on any of the client devices 411-413 may facilitate communications via application(s) executed by servers 414, or on individual server 416. An application executed on one of the servers may facilitate communication as part of a productivity service, for example. The application may retrieve relevant data from data store(s) 419 directly or through database server 418, and provide requested services (e.g. document editing) to the user(s) through client devices 411-413.

Network(s) 410 may comprise any topology of servers, clients, Internet service providers, and communication media. A system according to embodiments may have a static or dynamic topology. Network(s) 410 may include secure networks such as an enterprise network, an unsecure network such as a wireless open network, or the Internet. Network(s) 410 may also coordinate communication over other networks such as Public Switched Telephone Network (PSTN) or cellular networks. Furthermore, network(s) 410 may include short range wireless networks such as Bluetooth or similar ones. Network(s) 410 provide communication between the nodes described herein. By way of example, and not limitation, network(s) 410 may include wireless media such as acoustic, RF, infrared and other wireless media.

Many other configurations of computing devices, applications, data sources, and data distribution systems may be employed to implement a platform for providing a messaging-over-HTTP protocol for data exchange between a client and a server over a network. Furthermore, the networked environments discussed in FIG. 4 are for illustration purposes only. Embodiments are not limited to the example applications, modules, or processes.

Figure 5:
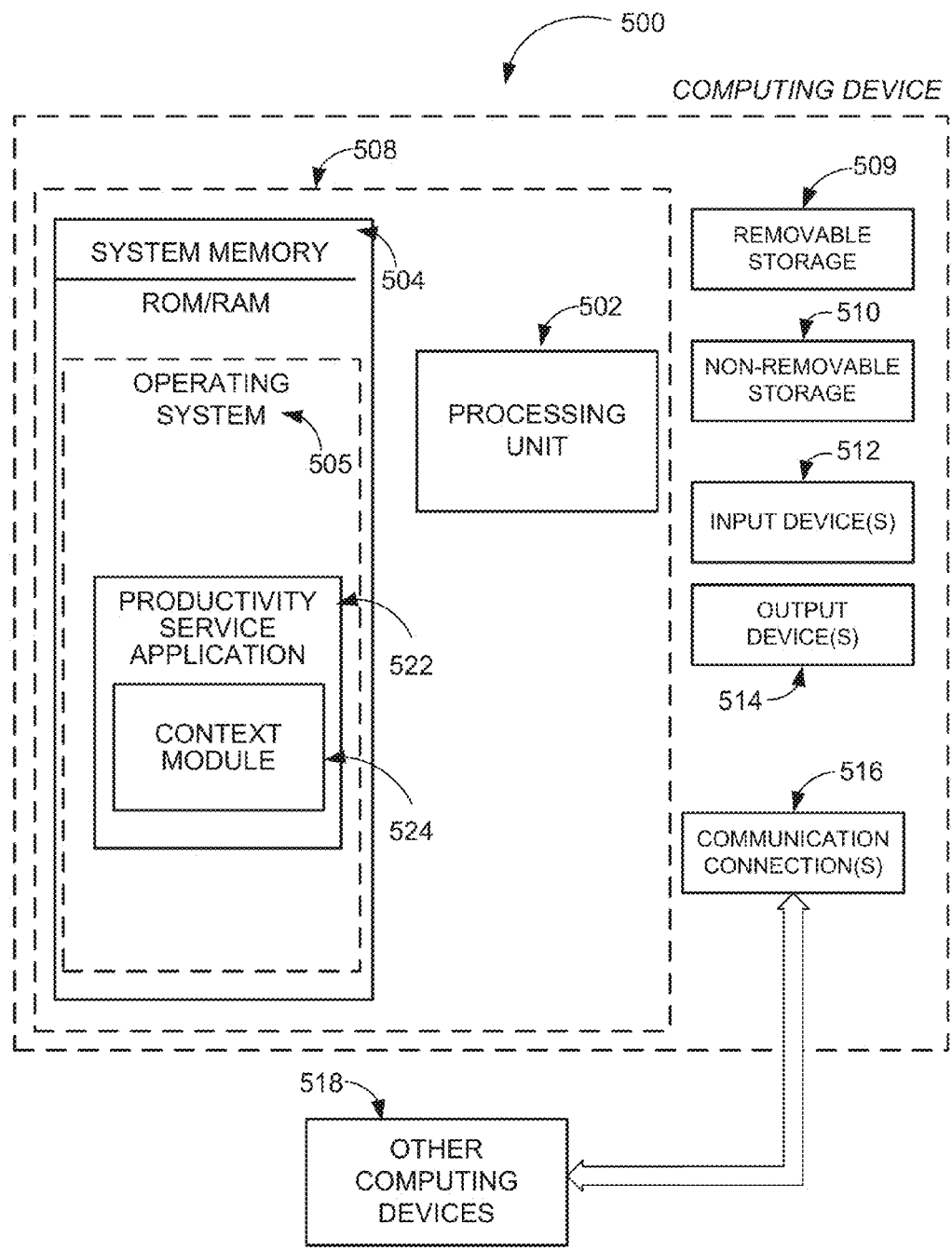
FIG. 5 is a block diagram of an example computing operating environment, where embodiments may be implemented.

FIG. 5 and the associated discussion are intended to provide a brief, general description of a suitable computing environment in which embodiments may be implemented. With reference to FIG. 5, a block diagram of an example computing operating environment for an application according to embodiments is illustrated, such as computing device 500. In a basic configuration, computing device 500 may be any computing device executing an application for providing a messaging-over-HTTP protocol for data exchange between a client and a server over a network according to embodiments and include at least one processing unit 502 and system memory 504. Computing device 500 may also include a plurality of processing units that cooperate in executing programs. Depending on the exact configuration and type of computing device, the system memory 504 may be volatile (such as RAM), non-volatile (such as ROM, flash memory, etc.) or some combination of the two. System memory 504 typically includes an operating system 505 suitable for controlling the operation of the platform, such as the WINDOWS® operating systems from MICROSOFT CORPORATION of Redmond, Wash. The system memory 504 may also include one or more software applications such as a productivity service application 522 and a context module 524.

The productivity application 522 may be an application offering a variety of services such as an email application, a social networking application, a collaboration application, an enterprise management application, a messaging application, a word processing application, a spreadsheet application, a database application and a presentation application. The productivity application 522 may be hosted at a remote server and may provide the services to a local client over a network. A context module 524 as part of the productivity application 522 may enable a client to establish a context with the server in order to enable the user to access and interact with data stored at a remote server, such as email, contacts and calendar data. The client may request data from the remote server employing a messaging-over-HTTP protocol which may provide instructions to the remote server for what data to retrieve and where to retrieve the data from, and may also instruct the remote server to send a receipt response and a series of chunk responses indicating a status of the processing of the request. Through the context module 524, the server may establish a context and may provide a cookie representing the context to the client. Productivity application 522 and context module 524 may be separate applications or integrated modules of a hosted service. This basic configuration is illustrated in FIG. 5 by those components within dashed line 508.

Computing device 500 may have additional features or functionality. For example, the computing device 500 may also include additional data storage devices (removable and/or non-removable) such as, for example, magnetic disks, optical disks, or tape. Such additional storage is illustrated in FIG. 5 by removable storage 509 and non-removable storage 510. Computer readable storage media may include volatile and nonvolatile, removable and non-removable media implemented in any method or technology for storage of information, such as computer readable instructions, data structures, program modules, or other data. System memory 504, removable storage 509 and non-removable storage 510 are all examples of computer readable storage media. Computer readable storage media includes, but is not limited to, RAM, ROM, EEPROM, flash memory or other memory technology, CD-ROM, digital versatile disks (DVD) or other optical storage, magnetic tape, magnetic disk storage or other magnetic storage devices, or any other medium which can be used to store the desired information and which can be accessed by computing device 500. Any such computer readable storage media may be part of computing device 500. Computing device 500 may also have input device(s) 512 such as keyboard, mouse, pen, voice input device, touch input device, and comparable input devices. Output device(s) 514 such as a display, speakers, printer, and other types of output devices may also be included. These devices are well known in the art and need not be discussed at length here.

Computing device 500 may also contain communication connections 516 that allow the device to communicate with other devices 518, such as over a wired or wireless network in a distributed computing environment, a satellite link, a cellular link, a short range network, and comparable mechanisms. Other devices 518 may include computer device(s) that execute communication applications, web servers, and comparable devices. Communication connection(s) 516 is one example of communication media. Communication media can include therein computer readable instructions, data structures, program modules, or other data. By way of example, and not limitation, communication media includes wired media such as a wired network or direct-wired connection, and wireless media such as acoustic, RF, infrared and other wireless media.

Example embodiments also include methods. These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be collocated with each other, but each can be only with a machine that performs a portion of the program.

Figure 6:
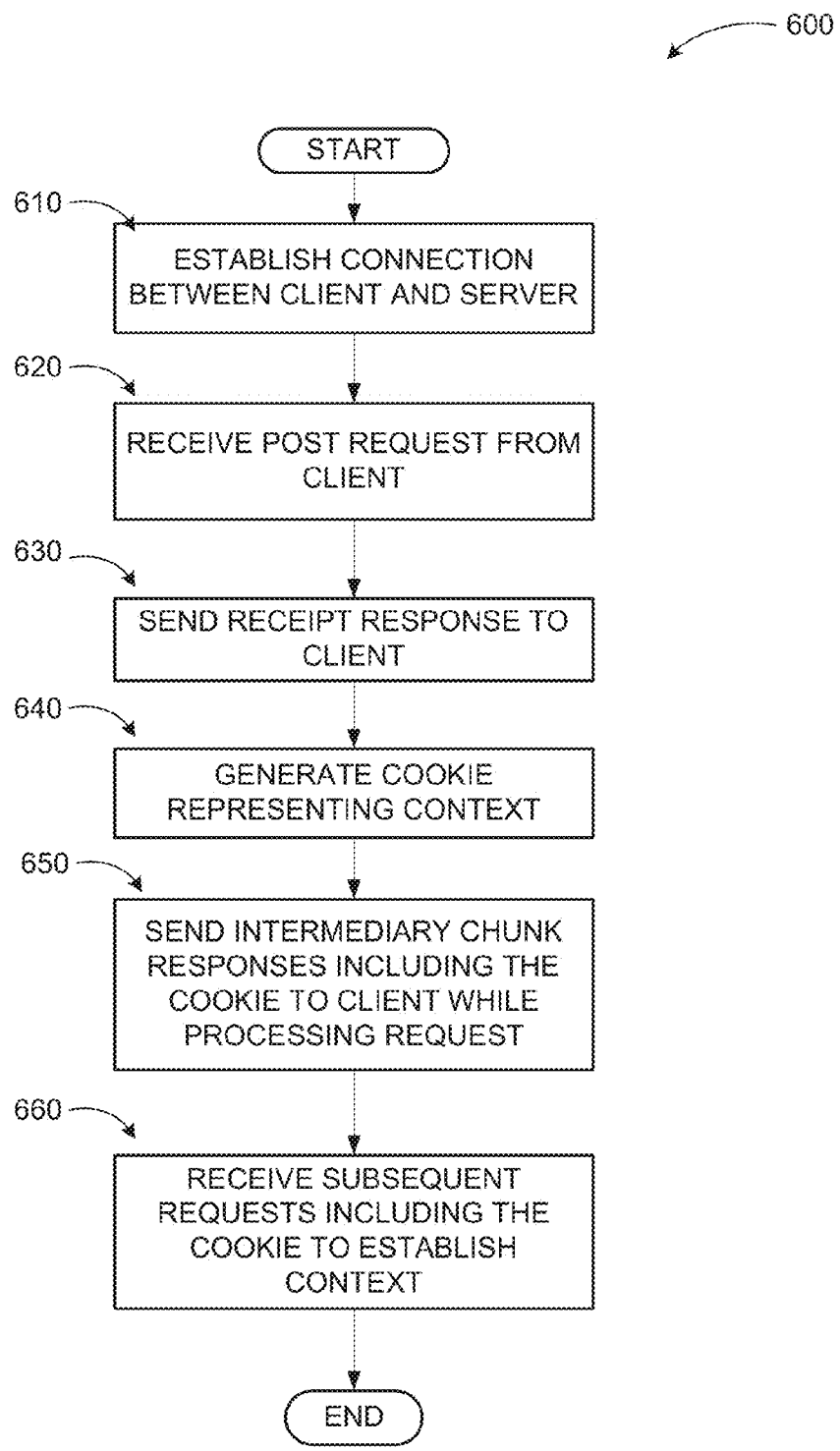
FIG. 6 illustrates a logic flow diagram for a process of providing a messaging-over-HTTP protocol to establish a context between a client and a server and to exchange data over a network, according to embodiments.

FIG. 6 illustrates a logic flow diagram for process 600 of providing a messaging-over-HTTP protocol to establish a context between a client and a server and to exchange data over a network, according to embodiments. Process 600 may be implemented on a computing device or similar electronic device capable of executing instructions through a processor.

Process 600 begins with operation 610, where a connection may be established between a client and server. A client may be a productivity service and/or a communication service accessing information and data from a remote server over a network, such as a cloud network. At operation 620, the server may receive a POST request from the client to initiate data retrieval at the server. The POST request may be a messaging-over-HTTP protocol which may include specialized headers with instructions for the data retrieval, including a request type header, a request identification header, a mailbox identification header and a content-type header. Operation 620 may be followed by operation 630 where the server may send a receipt response to the client upon receiving the POST request.

At operation 640, the server may generate a cookie representing a context between the client and the server. The context may identify the client at the server during subsequent data requests. At operation 650, the server may send intermediary chunk responses including the generated cookie to the client while the server processes the request. The intermediary chunk responses may indicate a status of the data request to the client. The cookie may be saved at the client, and may be maintained during dropped and transferred connections, and during hibernation of the client. At operation 660, the server may receive subsequent POST requests from the client including the cookie, and the server may automatically validate the context as being from the same authenticated client.

The operations included in process 600 are for illustration purposes. Providing a messaging-over-HTTP protocol to establish a context between a client and a server and to exchange data over a network may be implemented by similar processes with fewer or additional steps, as well as in different order of operations using the principles described herein.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method executed at least in part in a computing device for providing messaging-over hypertext transfer protocol (HTTP) to establish a context between a client and a server and to exchange data over a network, the method comprising:
   receiving a connection request from a client;
   establishing a first connection with the client;
   receiving a data request from the client over the connection, wherein the data request comprises a specialized header specifying a content type, a content length, an operation to be performed, and an identity of the client making the request;
   sending a receipt response to the client;
   generating a cookie representing a context between the client and the server, wherein the context represents a collection of state of the server that is maintained for a subsequent request from the client after interruption of the first connection, and wherein re-authentication of the client is not required when the cookie is provided with the subsequent request; and
   providing the cookie to the client.

2. The method of claim 1, wherein receiving the data request further comprises:
   receiving another request, wherein the other request includes one or more headers with instructions for processing the data request.

3. The method of claim 2, wherein the headers include one or more of: a type header, a request identification header, a mailbox identification header and a content-type header.

4. The method of claim 3, wherein the type header specifies an operation the client is attempting to perform.

5. The method of claim 4, wherein the type header is set to one of: a connect value for accessing a mailbox and a bind value for accessing an address book associated with a contacts management application.

6. The method of claim 1, further comprising:
   sending a series of intermediary chunk responses to the client while processing the data request.

7. The method of claim 6, wherein sending intermediary chunk responses further comprises:
   including a header in at least one intermediary chunked response of the series of intermediary chunk responses with "chunked" as a transfer encoding value.

8. The method of claim 7, further comprising:
   including the cookie in at least one intermediary chunked response of the series of intermediary chunk responses to the client to provide the cookie to the client.

9. The method of claim 1, further comprising:
   enabling the cookie to be maintained at the client during one or more of: a disconnection, a reconnection, and a hibernation of the client.

10. The method of claim 1, further comprising:
    receiving the cookie from the client during a subsequent data request; and
    validating the context associated with the cookie on the subsequent data request is being used by a same authenticated client who initially created the context and associated cookie.

11. The method of claim 10, further comprising:
    storing the context.

12. A server for data exchange between a client and a productivity service over a network, comprising:
    a memory storing instructions;
    a processor coupled to the memory, the processor executing a data retrieval application, wherein the data retrieval application is configured to:
    receive a connection request;
    establish a first connection with the client;
    receive a data request over the connection, wherein the data request comprises a specialized header specifying a content type, a content length, an operation to be performed, and an identity of the client making the request;
    in response to the data request, send a receipt response;
    generate a cookie representing a context between the client and the server, wherein the context represents a collection of state of the server that is maintained for a subsequent request from the client after interruption of the first connection, and wherein re-authentication of the client is not required when the cookie is provided with the subsequent request; and
    provide the cookie in at least one of a series of intermediary chunk responses sent while processing the data request.

13. The server of claim 12, wherein the productivity service is configured to provide one or more of: an email application, a social networking application, a collaboration application, an enterprise management application, a messaging application, a word processing application, a spreadsheet application, a database application, a presentation application, and an email, contacts and calendaring management application.

14. The server of claim 12, wherein the data request includes one or more headers with instructions for how to process the data request.

15. The server of claim 14, wherein the headers include one or more of: a type header, a request identification header, a mailbox identification header and a content-type header.

16. The server of claim 12, wherein the data retrieval application is further configured to:
store the context for a predefined period of time; and
discard the context after the predefined period of time expires.

17. The server of claim 16, wherein the predefined period of time is configurable based on one or more of: a network type, a client type, client devices associated with user, and one or more security parameters.

18. The server of claim 17, wherein the period of time to store the context is dynamic based on available resources at the server and a quantity of client applications and the client devices interacting with the server.

19. A storage device with instructions stored thereon that, when executed by at least one processor, perform a method for providing messaging-over hypertext transfer protocol (HTTP) to establish a context between a client and a server and to exchange data over a network, the method comprising:

receiving a connection request;
establishing a first connection with the client;
receiving a data request over the connection, wherein the data request comprises a specialized header specifying a content type, a content length, an operation to be performed, and an identity of the client making the request;
in response to the data request, sending a receipt response;
processing the data request to retrieve requested data;
generating a cookie representing a context between the client and the server, wherein the context represents a collection of state of the server that is maintained for a subsequent request from the client after interruption of the first connection, and wherein re-authentication of the client is not required when the cookie is provided with the subsequent request;
sending the cookie in at least one of a series of intermediary chunk responses sent to the client while processing the data request; and
upon providing the requested data, sending a final response.

20. The storage device of claim 19, wherein the method further comprises:
enabling the cookie to be maintained at the client during one or more of: a disconnection, a reconnection, and a hibernation of the client;
receiving the cookie during a subsequent data request; and
validating the context associated with the cookie on the subsequent request is being used by a same authenticated client who initially created the context and associated cookie.

* * * * *